United States Patent Office 3,629,163
Patented Dec. 21, 1971

3,629,163
EPOXIDE RESIN CELLULAR PLASTICS AND
THEIR MANUFACTURE
Ernst Nolken, Frankfurt am Main, Germany, assignor to
Farbwerke Hoechst Aktiengesellschaft Meister Lucius
& Bruning, Frankfurt am Main, Germany
No Drawing. Filed May 5, 1969, Ser. No. 822,043
Claims priority, application Germany, May 13, 1968,
P 17 70 400.6
Int. Cl. C08g 53/10
U.S. Cl. 260—2.5 EP                                    11 Claims

ABSTRACT OF THE DISCLOSURE

A process for producing cellular plastic materials by curing epoxide compounds having more than one epoxide group in the molecule which comprises carrying out the curing and foaming in the presence of mixtures of phosphorous acid with Lewis acids and in the presence of volatile expanding agents and optionally in the presence of pore regulating substances, reactive diluents and comonomers or mixtures of the last-mentioned substances, diluents and comonomers. The cellular plastics obtained may have either closed cells or open cells or simultaneously closed and open cells, the proportion of which is adjustable.

The present invention relates to epoxide resin cellular plastics and to a process for their manufacture.

It is known to cure epoxide resins with Lewis acids such as boron trifluoride, tin tetrachloride and antimony pentachloride. When curing is performed in the presence of low boiling solvents as expanding agent, cellular plastics are obtained. Epoxide resin cellular plastics produced with Lewis acids as catalysts have, however, undesired properties, such as shrinking and crack formation.

It has also been proposed to cure epoxide resins with acids, such as orthophosphoric acid, phosphoric acid monoesters, alkylphosphonic acids and benzene-1,3-disulfonic acid. British Pat. 869,969 describes the curing of epoxide resins with triesters of phosphorous acid which are added to the epoxide resins as latent curing agent and which bring about curing when the mixture of epoxide resin and phosphorous acid triester is exposed to atmospheric humidity. To produce reactive cellular plastics from epoxide resins the triesters of phosphorous acid are, however, unsuitable as latent curing agents.

When phosphorous acid, orthophosphoric acid or phosphoric acid monoesters are used to foam epoxide resins, foamed polymers are obtained which are incompletely cross-linked so that large proportions of low molecular weight products can be extracted.

The present invention provides a process for the manufacture of cellular plastics by curing epoxide compounds having more than one epoxide group in the molecule, in the presence of liquid expanding agents and optionally pore regulating substances, which comprises using as curing agent mixtures of phosphorous acid with Lewis acids, optionally in the presence of inert solvents, reactive diluents and comonomers or mixtures of the said substances.

Epoxide resins that can be used are compounds having more than one and in general at most 10 epoxide groups in the molecule, for example reaction products of epichlorohydrin with polyhydric alcohols, especially with mono- and poly-nuclear, polyhydric phenols. It is likewise possible to use di- and polyglycidyl esters, as well as compounds obtained by epoxidizing di- and polyolefins, dienes, cyclic dienes and diolefinically unsaturated carboxylic acid esters. Still further, there may be used telomers and cotelomers containing glycidyl ethers and/or glycidyl ester groups. Especially good results are obtained with reaction products of 2,2-diphenylol-propane with epichlorohydrin. For foaming there are preferably used epoxide resins that are liquid at room temperature and have epoxide equivalents of from 100 to 300. It is likewise possible, however, to use solid epoxide resins or epoxide resins having higher epoxide equivalents provided that they can be liquified by the addition of expanding agents or comonomers. Suitable comonomers are, for example phenylglycidyl ether, 3,3-bis(chloromethyl)-oxacyclobutane, tetrahydrofurane, α-valerolactone or ε-caprolactone. The lactones or cyclic ethers are generally used in an amount of from 1 to 40, preferably 1 to 20% by weight, calculated on the epoxide resin used.

Suitable Lewis acids to be used in combination with phosphorous acid are, for example, boron trifluoride, tin tetrachloride and phosphorus pentafluoride as well as the complex compounds thereof with alcohols, phenols, carboxylic acids, ethers, esters, ketones, amines, nitriles and acid amides, such as $BF_3$ mono- and dihydrate, $BF_3 \times 2C_2H_5OH$, $BF_3 \times O(C_2H_5)_2$, $BF_3 \times 2CH_3COOH$, $BF_3 \times$ piperidine, $BF_3 \times$ aniline, $BF_3 \times$ orthochloroaniline, 4,4'-diaminodiphenylmethane $\times 2BF_3$, $$SnCl_4 \times 2O(C_2H_5)_2$$

$PF_5 \times$ tetrahydrofurane and dihydroxy fluoboric acid or difluoboric acid (cf. Kirk. Othmer, vol. 6, page 685) and the salts of hydrofluoric acid with aromatic amines.

The Lewis acid is generally used in an amount of from 0.01 to 5, preferably 0.1 to 3 mole percent, calculated on the mean epoxide equivalent of the resin used. The amount of phosphorous acid should range in general from 0.01 to 0.8, preferably from 0.05 to 0.5 POH equivalent per epoxide equivalent.

To produce cellular plastics readily volatile halohydrocarbons or hydrocarbons are added in known manner to the epoxide resin, for example monofluorotrichloromethane, monofluorodichloromethane, 1,2,2-trifluorotrichloroethane, 1,2-dichlorotetrafluoroethane, methylene chloride or pentane. According to the molecular weight of the expanding agent and the desired density of the foamed material 2 to 30% of halohydrocarbon or hydrocarbon are generally added to the epoxide resin.

In order to produce a foamed material the pores of which are as uniform as possible it is advantageous to add pore-regulating substances, for example silicone oils.

To bring about foaming the mixture of Lewis acid and phosphorous acid is stirred with the epoxide resin containing the expanding agent and possibly containing the pore regulating substance. To obtain homogenous mixtures of the reaction components they shold be used in the form of low viscous liquids. Hence, it is advantageous to add to the epoxide resin inert solvents such as ethers, for example diethyl ether, diisopropyl ether, dioxane, ethylene glycol dimethyl ether, diethylene glycol diethyl ether, ketones for example acetone, methylethyl ketone, methylisobutyl ketone, or esters for example methyl and ethyl formate, oxalic acid diethyl ester, succinic acid diethyl ester or adipic acid diethyl ester.

It is especially advantageous to add to the curing agent mixture liquid comonomers, that is to say compounds that undergo copolymerization with the epoxide resin, for example cyclic ethers or lactones. It may also be advantageous to add to the curing agent mixture reactive diluents, i.e. compounds that react with the epoxide resin with polyaddition, for example polyols containings hydroxyl groups, such as diethylene glycol, hexane-triol-1,2,6 or hydroxypropylated trimethylolpropane, furthermore bisphenols or phosphorus compounds containing OH or POP groups, or mixtures of the aforesaid compounds.

Suitable lactones are, for example, β-propiolactone, 3-methyl-β-propiolactone, 4-methyl-β-propiolactone, 3,3-dimethyl-β-propiolactone, 4-trichloromethyl-β-propiolactone, 4,4-bis-(trichloromethyl)-β-propiolactone, γ-butyrolactone, δ-valerolactone, ε-caprolactone, 2-methyl-δ-valerolactone, monomethyl-, monoethyl-, monopropyl-, monoisopropyl-, up to monododecyl-ε-caprolactone, dialkyl-ε-caprolactones in which the two alkyl groups are bound to one and the same or to different carbon atoms but the ε-carbon atom not carrying both of them, trialkyl-ε-caprolactones in which two or three carbon atoms in the lactone ring carry substituents, alkoxy-ε-caprolactones such as methoxy- and ethoxy-ε-caprolactones, cycloalkyl-, aryl-, and aralkyl-ε-caprolactones, such as cyclohexyl-, phenyl-, and benzyl-ε-caprolactones, It is likewise possible to use lactones having more than 6 carbon atoms in the ring such as ζ-oenantholactone and η-caprilactone.

Comonomers in which the catalyst can be dissolved are, for example, propylene oxide, epichlorohydrin, phenylglycidyl ether, oxacyclobutane, 3-methyl-oxycyclobutane, 3,3-dimethyl-oxacyclobutane, 3,3-bis(chloromethyl)-oxacyclobutane and tetrahydrofurane.

When the aforesaid comonomers are added to phosphorous acid heating occurs so that it is expedient to maintain the mixture of comonomer or comonomers with phosphorous acid at room temperature or at low temperature, for example $-10°$ C. by cooling. The solution can be directly used for foaming the epoxide resin, alternatively the solvent acting as comonomer may be allowed to polymerize partially or completely before it is added, together with the other components, to the batch from which the cellular plastic is then obtained.

Suitable reactive diluents for the curing agent combination of phosphorous acid and Lewis acid are also phosphonic acids such as methyl-, ethyl-, vinyl-, 2-chloroethyl-, propyl-, butyl-, phenyl-, hydroxymethane-, α-hydroxyethane-, α-hydroxypropane-, and α-hydroxy-α-phenyl-methane-phosphonic acid or monoalkyl-, monocycloalkyl-, and monoaryl esters of phosphoric acid or phosphorous acid, such as methyl-, ethyl-, propyl-, isopropyl-, n-butyl, i-butyl-, tert.-butyl-, methoxyethyl-, butoxyethyl-, phenyl-, 2-methylphenyl-, 3-methylphenyl-, 2,4,6-trichlorophenyl-, or 2,4,6-tribromophenyl esters. As phosphoric acid esters there may be used phosphoric acid monoesters containing a lesser or larger proportion of diester, as obtained in the reaction of phosphorus pentoxide with alcohols or phenols. The phosphoric acid derivatives that can be used together with phosphorous acid can be added in an amount up to 1 equivalent calculated on the epoxide resin, i.e. one hydroxyl equivalent of phosphorus compound for one equivalent of epoxide. To obtain cellular plastics having favorable properties amounts below 1 equivalent of the aforesaid phosphorus compounds proved advantageous, preferably 0.1 to 0.4 hydroxyl equivalent for one epoxide equivalent.

In many cases it is advantageous to add to the curing agent combination of phosphorous acid and Lewis acid specific compounds of pentavalent phosphorous to avoid crystallization of the phosphorous acid in the curing agent combination and to facilitate dosing of the latter. Suitable compounds of pentavalent phosphorus are, for example, ortho-phosphoric acid, phosphoric acid derivatives containing POP groups, for example a tetraalkyl ester of diphosphoric acid, a pentaalkyl ester of triphosphoric acid, a hexaalkyl ester of tetraphosphoric acid or an alkyl ester of metaphosphoric acid, as obtained, for example, by reacting trialkyl phosphates with phosphorus pentoxide in appropriate proportions. It is likewise possible to use acid polyphosphoric acid esters of di-, tri-, tetra-, and pentaphosphoric acid as obtained when phosphoric acid mono- and diesters are reacted with $P_2O_5$, or phosphoric acid monoalkyl, dialkyl and trialkyl esters with polyphosphoric acid preferably having up to 10 phosphorus atoms which is easier to handle than $P_2O_5$. Besides the alkyl esters of the aforesaid polyphosphoric acids, the alkyl groups of which generally contain 1 to 10 carbon atoms, preferably 1 to 4 carbon atoms in linear or branched arrangement and may carry halogen atoms as substituents, there can also be used aryl esters such as phenyl-, methylphenyl-, chlorophenyl-, and 1,3,5-tribromophenyl esters. Still further, there may be used reaction products of the aforesaid neutral and acid polyphosphoric acid esters with aliphatic and cycloaliphatic diols, triols, polyether diols and polyhydric phenols such as resorcinol and polyhydric, polynuclear phenols such as 4,4'-dihydroxy-diphenylmethane or 4,4'-dihydroxy-diphenyl-2,2-propane. As components containing POP groups there are also suitable acid and neutral di-, tri-, tetra-, and polyphosphonic acid esters as well as mixed polyphosphoric/phosphonic acid esters. The phosphorus compounds which contain POP groups and may contain P—OH groups are used in an amount such that 0.05 to 0.6 and preferably 0.1 to 0.4 POP and POH equivalent are present for each epoxide equivalent.

The lactones and copolymerizable cyclic ethers may, of course, also be used as solvents, together with the phosphorus compounds, for the curing agent combination of phosphorous acid and Lewis acid.

By the process of the invention there can be produced cellular plastics having closed as well as open cells. When phosphorous acid and Lewis acid are used the cells are predominantly closed and by adding orthophosphoric acid to the phosphorous acid a cellular plastic is produced the cells of which are all open. The percentage of open cells can be adjusted as desired by variation of the proportion of phosphorous acid to orthophosphoric acid, whereby the heat and sound insulating properties of the cellular plastic can be optimized in accordance with the field of application.

To the mixture to be foamed there may also be added polyphenols such as dihydroxydiphenylmethane, 4,4'-dihydroxydiphenyl-2,2-propane, resorcinol and the reaction products known as novolaks of mono- or polyhydric, mono- or polynuclear phenols with formaldehyde, such as phenol, cresol, resorcinol or bisphenol A novolak. These compounds are added to the batch in an amount of from 2 to 40% by weight, calculated on the epoxide resin, preferably 5 to 20% by weight, in the form of a solution in the epoxide resin and/or in the curing agent component. The upper limit of the amount to be added depends in the first place on the viscosity of the components to be foamed. By adding compounds of the aforesaid type the dimensional stability under heat according to Martens of the cellular plastics is raised by 20 to 30° C.

Besides expanding agent and pore regulators there may be added to the mixture to be foamed fillers, dyestuffs, fluorescing dyestuffs, plasticizers and flame inhibiting substances.

The epoxide resin and the curing agent components may be mixed batchwise with suitable stirrers or continuously in foaming machines. The mixture to be foamed can be injected into or mixed in the moulds wherein foaming takes place. The residence time of the mixture to be foamed in the mould depends on the epoxide resin used, the catalyst concentration and the temperatures of the individual components.

In normal cases the mixture can be stirred for 10 to 20 seconds which is sufficient to bring about thorough homogenization. The components to be mixed may have identical or different temperatures in the range of from 5 to 45° C., preferably 10 to 35° C. The speed of foaming can be adjusted within a period of 15 seconds to about 10 minutes by the concentration of phosphorous acid, the type and concentration of the Lewis acid or Lewis acid complex compound. After having reached its full height the cellular plastic loses its tackiness after 10 seconds to a few minutes.

The starting substances used in the process of the invention to produce a cellular plastic are easy to handle and the foamed materials obtained have better mechanical properties than epoxide cellular plastics obtained by known processes. They are especially distinguished by a low tendency to form cracks in the interior.

The cellular plastics according to the invention can be used as packing material, in sandwich constructions and as insulating substances against cold, heat, sound, and impact, as well in electrotechnics. They are distinguished by an especially good adherence on steel, aluminum, cardboard, stone, ceramics and plastics materials.

The following examples serves to illustrate the invention but they are not intended to limit it thereto, the parts are by weight unless otherwise stated. The product used as epoxide resin was a diglycidyl ether of 4,4′-dihydroxydiphenyl-2,2-propane having an epoxide equivalent of 190 and a viscosity of 11,800 centipoises at 25° C. The silicone oil used was a commercial product by UCC, marketed under the designation L 531.

EXAMPLE 1

100 parts of epoxide resin were mixed with 1 part of silicone oil and 15 parts of trichlorofluoromethane and the mixture was stirred at 25° C. for 40 seconds with a curing agent solution obtained by dissolving while heating 3.6 parts of phosphorous acid and 0.6 part of boron trifluoride/aniline complex compound in 2.4 parts of polyphosphoric acid ethyl ester. The foam had reached its full height after 110 seconds, it was solid and free from tackiness after 8 minutes. The cellular plastic obtained had fine pores, it did not shrink, was free from cracks, had a good abrasion resistance and closed cells. The density was 30 grams per liter and the dimensional stability under heat 127° C.

Comparative Example 1a

The experiment was carried out as described in Example 1 with the exception that no $BF_3$-aniline complex compound was used in the curing agent mixture. The cellular plastic obtained was still soft after 10 minutes, it reached only 1% of the height of the foam of Example 1 had collapsed after a further 10 minutes.

Comparative Example 1b

The experiment was carried out as described in Example 1 with the exception that the $BF_3$/aniline complex compound was used as curing agent without addition of phosphorous acid and polyphosphoric acid ethyl ester. Foaming did not set in. The $BF_3$/aniline complex compound was then added in the form of a solution in 1.2 parts of diethylene glycol.

The polyphosphoric acid ethyl ester had been prepared by dissolving 40 parts of phosphorus pentoxide in 60 parts of triethyl phosphate with exclusion of atmospheric moisture. The $P_2O_5$ was added to the triethyl phosphate in portions whereby the temperature of the mixture rose to 60° C. To complete dissolution of the $P_2O_5$ the mixture was stirred for 90 minutes whilst heating at 90° C.

EXAMPLE 2

A mixture of 90 parts of epoxide resin, 10 parts of bisphenol A novolak, 1 part of silicone oil and 15 parts of trichlorofluoromethane was mixed for 15 seconds with the aid of a rapid stirrer with a curing agent solution of 4.2 parts of phosphorous acid, 1.8 parts of polyphosphoric acid ethyl ester and 0.6 part of $BF_3$/orthochloroaniline complex compound. The mixture was poured into a mould. The height of the cellular plastic increased for 60 seconds. After a further 15 seconds the cellular plastic was solid and no longer tacky. It had fine pores, was homogeneous and free from cracks, did not shrink and had a good abrasion resistance. The density was found to be 30 grams per liter. 85% of the cells were closed. The dimensional stability under heat of the cellular plastic was 125° C.

EXAMPLE 3

10 parts of p-cresol novolak having a melting point of 115 to 118° C. and a mean molecular weight of 856 were dissolved while heating in 90 part of epoxide resin. After cooling the solution was mixed with 1 part of silicone oil and 15 parts of trichlorofluoromethane. To bring about foaming a solution of 0.46 part of $BF_3$ ortho-chloraniline in 4.6 parts of phosphorous acid was stirred in as curing agent for 45 seconds with a rapid stirrer whereupon the mixture was poured into a mould. The foam had reached its full height after 70 seconds, after a further 90 seconds it was solid and no longer tacky. A homogeneous cellular plastic was obtained having fine pores, being free from cracks, having a density of 30 grams per liter and a good abrasion resistance. 80% of the cells were closed.

EXAMPLE 4

20 parts of an epoxide resin having a higher molecular weight on the basis of bisphenol A/epichlorohydrin with an epoxide equivalent of 500 and a melting point of 64 to 74° C. were dissolved while heating in 80 parts of epoxide resin. After cooling 1 part of silicone oil and 15 parts of trichlorofluoromethane were added. To bring about foaming the mixture was stirred for 40 seconds with a solution of 6 parts phosphorous acid and 0.4 part of $BF_3$/orthochloroaniline in 2 parts of tetrahydrofurane. Foaming was terminated after 60 seconds. After a further 10 seconds the cellular plastic was solid and free from tackiness. The cellular plastic material obtained had fine pores, was free from cracks, homogeneous, it shrunk a little, had closed cells and a density of 33 grams per liter.

EXAMPLE 5

15 parts of novolak from bisphenol A (4,4′-dihydroxydiphenyl-2,2-propane) melting at 100° C. and having a mean molecular weight of 609 were dissolved while heating in 85 parts of epoxide resin. After cooling the solution was stirred with 1 part of pore regulator and 15 parts of trichlorofluoromethane. To bring about foaming a catalyst solution consisting of 2 parts of phosphorous acid, 1 part of diethyl ether and 0.6 part of $BF_3$/ortho-chloroaniline complex compound was stirred in within 1 minute and the mixture was poured into a mould. The foam had reached its full height after 3 minutes, after a further minute it was no longer tacky. The foamed material obtained had fine pores, was homogeneous, free from cracks and had a density of 29 g./l. 80% of the cells were closed. The dimensional stability under heat was found to be 112° C.

EXAMPLE 6

10 parts of 4,4′-dihydroxydiphenyl-2,2-propane novolak having a melting point of 100° C. and a mean molecular weight of 609 were dissolved while heating in 90 parts of epoxide resin. After cooling the solution was stirred with 1 part of silicone oil and 15 parts of trichlorofluoromethane and as curing agent a liquid mixture of 2 parts of phosphorous acid, 2 parts of orthophosphoric acid and 0.8 part of $BF_3$/orthochloroaniline complex compound was stirred in within 30 seconds. The mixture was poured at once into a mould wherein the foaming was terminated after 60 seconds. After a further 10 seconds the foam was free from tackiness. The cellular shaped article obtained was homogeneous, colorless, had fine pores, did not shrink and was free from cracks. It had a density of 30 grams per liter. 90% of the cells were open, the dimensional stability under heat was 103° C.

EXAMPLE 7

A cellular plastic material was produced as described in Example 1. As resin mixture 90 parts of epoxide resin, 10 parts of p-cresol novolak, 1 part of silicone oil and 15 parts of monofluorotrichloromethane were used. The curing agent solution was prepared from 2.4 parts of phosphorous acid, 1.6 parts of polyphosphoric acid ethyl ester and 0.8 part of $BF_3$/aniline complex compound. The mixing time of resin component and curing agent solution was 55 seconds. Foaming was terminated after 3 minutes. After a further 6 minutes the surface of the foam was no longer tacky. The foamed article obtained had fine pores, was free from cracks, did shrink a little, and had closed pores. The density was 35 grams per liter and the dimensional stability under heat 122° C.

EXAMPLE 8

The resin mixture of Example 7 was used. As curing agent solution there was used a solution of 3.2 parts of phosphorous acid and 0.8 part of $BF_3$/aniline complex compound in 0.8 part of butyrolactone. The mixing time with the curing agent solution was 30 seconds, foaming was terminated after 90 seconds. After a further 8 minutes the foamed article was free from tackiness. It had fine pores, was free from cracks, did shrink a little and had a good abrasion resistance. The density was 30 grams per liter and the dimensional stability under heat 146° C.

EXAMPLE 9

The resin mixture of Example 7 was used. It was stirred for 1 minute with a solution of 2 parts of $BF_3$/aniline complex compound in 3 parts of hexane-triol 1,2,6. The mixture of resin and curing agent was stable in storage for a few hours. To bring about foaming it was mixed for 45 seconds with a solution of 3.6 parts of phosphorous acid in 2.4 parts of polyphosphoric acid ethyl ester. Foaming was terminated after 150 seconds. After a further 90 seconds the foam was free from tackiness. It had fine pores, no cracks, and shrunk a little. The foamed article was colorless, had closed cells and a density of 30 grams per liter.

EXAMPLE 10

The resin mixture of Example 7 was used and as curing agent a solution of 0.4 gram of $BF_3$/orthochloroaniline complex compound, 0.4 g. of $BF_3$/aniline complex compound, 0.4 g. of $BF_3$/2,4-dimethylaniline complex compound and 0.4 g. of $BF_3$/benzylamine complex compound and 2.6 parts of phosphorous acid in 0.8 part of butyrolactone was used. The resin component and the curing agent solution were mixed for 1 minute. Foaming was terminated after 2 minutes. After a further 5 minutes a solid cellular article was obtained which was no longer tacky; it had fine pores, closed cells, no cracks, did not shrink and had a dimensional stability under heat of 141° C.

EXAMPLE 11

Component I: 100 parts of epoxide resin, 1 part of pore regulator, 15 parts of monofluorotrichloromethane.

Component II: 1 part of $BF_3$/orthochloroaniline, 2,4-parts of phosphorous acid and 1.6 parts of polyphosphoric acid ethyl ester.

Container I of a two component foaming machine with adjustable dosing ratio and extruder head was charged with component I and container II was charged with component II. The dosing ratio of component I to component II was adjusted to 20:1. The rate of extrusion of the machine was 3.6 kilograms per minute. The mixture to be foamed was 3.6 kilograms per minute. The mixture to be foamed wax extruded on cardboard. Foaming was terminated after 100 seconds and after a further 20 seconds the foam did no longer stick. A uniform, firmly adhering foam layer having a thickness of 4 cm. was obtained. The foam had a density of 29 grams per liter and a compressive strength of 1.43 kp./cm.² 76% of the cells were closed. The dimensional stability under heat was 120° C.

EXAMPLE 12

The experiment was carried out as described in Example 11 with the exception that the dosing ratio of component I to component II was adjusted to 15:1. Foaming was terminated after 30 seconds, after a further 15 seconds the foam layer did no longer stick. A homogeneous colorless layer was obtained which had fine pores, firmly adhered to the support, was resistant to abrasion and hard. The layer thickness was 3 cm. The cellular epoxide resin had a density of 28 grams per liter and a compressive strength of 1.2 kp./cm.². 78% of the cells were closed.

EXAMPLE 13

100 parts of cresol novolak melting at 115–118° C. and having a mean molecular weight of 856 was dissolved in 900 parts of epoxide resin by heating for a short period of time at 140° C. After cooling to room temperature 10 parts of pore regulator and 150 parts of trichlorofluoromethane were stirred in. To bring about foaming a solution of 6 parts of $BF_3$/orthochloroaniline complex compound, 18 parts of phosphorous acid and 12 parts of polyphosphoric acid ethyl ester was mixed as hardener for 45 seconds at 25° C. with the resin component and the mixture was poured into a mould of dimensions 30 x 30 x 38 cm. Foaming was terminated after 3 minutes. After a further 3 minutes the cellular epoxide resin did no longer stick. It had fine pores, was free from cracks, did not shrink and had a density of 30.5 grams per liter. The foamed block had a compressive strength of 2.4 kp./cm.², 90% of the cells were closed, the dimensional stability under heat was 128° C. and the thermal conductivity 0.016 (in kcal/m.hr. centigrades at 20° C.).

EXAMPLE 14

The experiment was carried out as described in Example 13 with the exception that only 80 parts of trichlorofluoromethane were used. After a mixing time of 35 seconds, a foaming period of 2 minutes and a resting time of a further minute a non sticky foamed block having a density of 55 grams per liter was obtained. The compressive strength was 5.3 kp./cm.². 85% of the cells were closed, the dimensional stability under heat was 113° C., the thermal conductivity 0.019, the flexural strength 5.5 kp./cm.², the impact strength 0.36 kp./cm.² and the shear strength 3.3 kp./cm.².

EXAMPLE 15

150 parts of cresol novolak were dissolved while heating in 800 parts of epoxide resin and 50 parts of ε-caprolactone were added. After cooling to room temperature 10 parts of pore regulator and 220 parts of trichlorofluoromethane were stirred in. As curing agent there were added 7 parts of $BF_3$/orthochloroaniline complex compound, 21 parts of phosphorous acid and 14 parts of polyphosphoric acid ethyl ester. Mixing of resin and curing agent component was preformed for 30 seconds, foaming was terminated after 6 minutes and after a further 6 minutes the surface of the foamed block did no longer stick. The cellular epoxide resin had fine pores, was free from cracks, did not shrink, was resistant to abrasion and had a density of 23 grams per liter 1.64 kp./cm.². 83% of the cells were closed, the dimensional stability under heat was 111° C.

EXAMPLE 16

The resin mixture of Example 15 was used, but only 30 parts of trichlorofluoromethane were added. The curing agent solution consisted of 5 parts of $BF_3$/orthochloroaniline complex compound, 15 parts of phosphorous acid and 10 parts of polyphosphoric acid ethyl ester. The components were mixed for 50 seconds, foaming was terminated after 70 seconds. After a further 30 seconds the hard cellular epoxide resin did no longer stick. It had fine pores, was free from cracks, did not shrink and had a density of 172 grams per liter. The compressive strength was over 25 kp./cm.². 70% of the cells were closed.

EXAMPLE 17

4,000 parts of epoxide resin, 750 parts of cresol novolak and 250 parts of ε-caprolactone were mixed while heating. The curing agent consisted of 25 parts of $BF_3$/orthochloroaniline complex compound and 125 parts of a 60:40 mixture of phosphorous acid and polyphosphoric acid ethyl ester. The resin/monoflurotrichloromethane component was mixed for 55 seconds at 25° C. with the curing agent solution. The mixture to be foamed was poured into a mould of dimensions 60 x 50 x 46 cm. Foaming was terminated after 7 minutes and after a further 9 minutes the surface of the cellular block did no longer stick. The cellular epoxide resin obtained had fine pores, it was free from cracks, did not shrink, was hard and tough and resistant to abrasion. The density was found to be 26 grams per liter, the compressive strength was 2.36 kp./cm.$^2$, the dimensional stability under heat 100° C. 80% of the cells were closed.

The mechanical properties were determined according to the following DIN standards:

Compressive strength—DIN 53421
Flexural strength—DIN 53423
Impact strength—DIN 53453
Shear strength—DIN 53422
Thermal conductivity—DIN 52612

Dimensional stability under heat according to Martens DIN 53424 cellular structure according to Remington-Pariser.

What is claimed is:

1. In a process for the manufacture of cellular plastics by curing epoxide resins having more than one epoxide group in the molecule in the presence of a liquid expanding agent and a curing agent, the improvement which comprises using a curing agent consisting essentially of a mixture of (a) from 0.01 to 5 mole percent, based on the average epoxide equivalent of the resin, of a Lewis acid selected from boron trifluoride, tin tetrachloride, phosphorous pentafluoride, complex compounds of said halides, dihydroxy fluoboric acid, difluoboric acid and hydrofluoric acid salts of aromatic amines and (b) phosphorous acid in an amount of 0.01 to 0.8 POH equivalents per peroxide equivalent of said resin.

2. A process according to claim 1 wherein curing of the epoxide resin is carried out in the presnce of an inert solvent.

3. A process according to claim 1 wherein curing of the epoxide resin is carried out in the presence of a diluent that is reactive with the epoxide groups of said resin.

4. A process according to claim 1 wherein curing of the epoxide resin is carried out in the presence of a comonomer reactive with said epoxide resin.

5. A process according to claim 1 wherein the reactive comonomer is selected from lactones, cyclic ethers and mixtures thereof.

6. A process according to claim 1 wherein curing of the epoxide resin is carried out in the presence of a phosphorous compound containing one or more groups selected from POH, POP and mixtures thereof.

7. A process according to claim 1 wherein the epoxide resin is cured in the presence of a phenol, cresol, resorcinol or bisphenol A aldehyde novolak.

8. A process according to claim 1 wherein the curing agent is a mixture of phosphorous acid and a boron trifluoride complex compound.

9. A process according to claim 1 wherein the curing agent is mixed with a polyphosphoric acid ethyl ester.

10. A process according to claim 1 wherein the curing of the epoxide resin is carried out in the presence of a pore regulating agent.

11. A cellular epoxide resin made by the process of claim 1.

References Cited

UNITED STATES PATENTS

| | | | |
|---|---|---|---|
| 3,051,665 | 8/1962 | Wismer et al. | 260—2.5 EP |
| 3,477,966 | 11/1969 | Doss | 260—2.5 EP |

FOREIGN PATENTS

| | | | |
|---|---|---|---|
| 682,879 | 3/1964 | Canada | 260—2.5 EP |

JOHN C. BLEUTGE, Primary Examiner

U.S. Cl. X.R.

260—2 EP, 2 EC, 2.5 F, 2.5 N, 47 EC, 830 R, 830 TW, 831, 835